United States Patent
Cleveland

(10) Patent No.: US 7,261,038 B2
(45) Date of Patent: Aug. 28, 2007

(54) LOW SHOCK SEPARATION JOINT AND METHOD THEREFOR

(75) Inventor: Mark A. Cleveland, Westminster, CA (US)

(73) Assignee: The Boeing Company, Chicago, IL (US)

( * ) Notice: Subject to any disclaimer, the term of this patent is extended or adjusted under 35 U.S.C. 154(b) by 8 days.

(21) Appl. No.: 10/692,966

(22) Filed: Oct. 24, 2003

(65) Prior Publication Data

US 2005/0193916 A1    Sep. 8, 2005

(51) Int. Cl.
    *F42B 15/38*    (2006.01)
(52) U.S. Cl. ...................................... 102/378; 89/1.14
(58) Field of Classification Search ................ 102/377, 102/378; 89/1.14; 60/632, 636
    See application file for complete search history.

(56) References Cited

U.S. PATENT DOCUMENTS

| 3,453,960 | A | * | 7/1969 | Qualls ........................ 102/378 |
| 3,505,925 | A | * | 4/1970 | Carr ............................. 89/1.1 |
| 3,633,456 | A | * | 1/1972 | Carr et al. .................... 89/1.14 |
| 3,919,939 | A | * | 11/1975 | Murray et al. ............... 89/1.14 |
| 4,106,875 | A | * | 8/1978 | Jewett ........................... 403/2 |
| 4,516,499 | A | * | 5/1985 | Eyman ....................... 102/293 |
| 4,685,376 | A | * | 8/1987 | Noel et al. ................... 89/1.14 |
| 4,879,941 | A | * | 11/1989 | Repe et al. .................. 89/1.14 |
| 5,129,306 | A | * | 7/1992 | Fauvel ........................ 89/1.14 |
| 5,331,894 | A |   | 7/1994 | Wassell et al. |
| 5,372,071 | A |   | 12/1994 | Richards et al. |
| 5,585,596 | A | * | 12/1996 | Richards et al. ............ 102/378 |
| 5,735,626 | A | * | 4/1998 | Khatiblou et al. ............ 403/16 |
| 5,992,328 | A | * | 11/1999 | Blain et al. ................. 102/378 |
| 6,076,467 | A | * | 6/2000 | Cespedosa et al. ......... 102/378 |
| 6,125,762 | A | * | 10/2000 | Fritz et al. .................. 102/378 |
| 6,820,559 | B1 | * | 11/2004 | Comtesse ................... 102/378 |

(Continued)

FOREIGN PATENT DOCUMENTS

EP    1 355 120 A    10/2003

(Continued)

OTHER PUBLICATIONS

PCT Written Opinion PCT/US2004/033563 Apr. 24, 2006 The Boeing Co.

(Continued)

*Primary Examiner*—David J. Parsley
(74) *Attorney, Agent, or Firm*—Ingrassia Fisher & Lorenz, P.C.

(57) ABSTRACT

Methods and apparatus are provided for a low shock separation joint. The separation joint comprises a male member, a female member, and an explosive device. At least one projection is formed on the male and female members. Surfaces of the at least one projection on the male and female members are mated to one another to prevent separation under compressive and tensile forces. The explosive device is placed within a cavity of the female member. A method for reducing shock in a separation joint is provided. An explosive device in the female member of the separation joint is detonated. A volume increase of the explosive device bends flanges of the female member away from one another. Surfaces in intimate contact with one another are moved out of contact with one another to decouple the male member from the female member.

8 Claims, 5 Drawing Sheets

U.S. PATENT DOCUMENTS

2003/0196544 A1 * 10/2003 Comtesse .................. 89/1.14
2004/0216634 A1    11/2004 Cleveland

FOREIGN PATENT DOCUMENTS

| EP | 1361411 | * | 11/2003 |
| FR | 2 854 669 A | | 11/2004 |
| WOWO | PCT/US2004/033563 | | 10/2004 |

OTHER PUBLICATIONS

PCT Int'l Preliminary Rpt PCT/US2004/033563 Apr. 24, 2006 The Boeing Co.

* cited by examiner

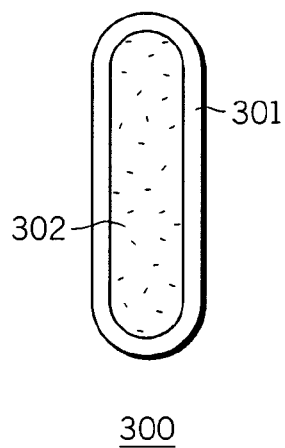
FIG. 3
-PRIOR ART-
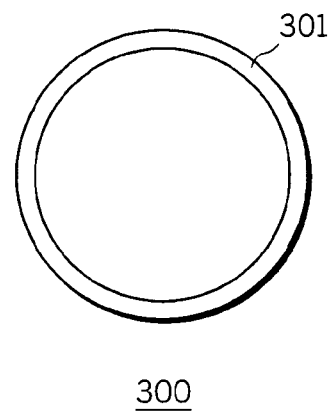
FIG. 4
-PRIOR ART-
FIG. 5
-PRIOR ART-
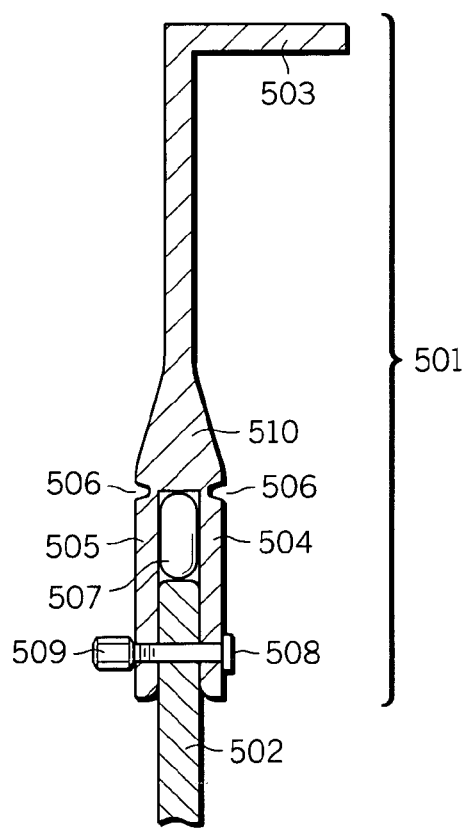
FIG. 6
-PRIOR ART-
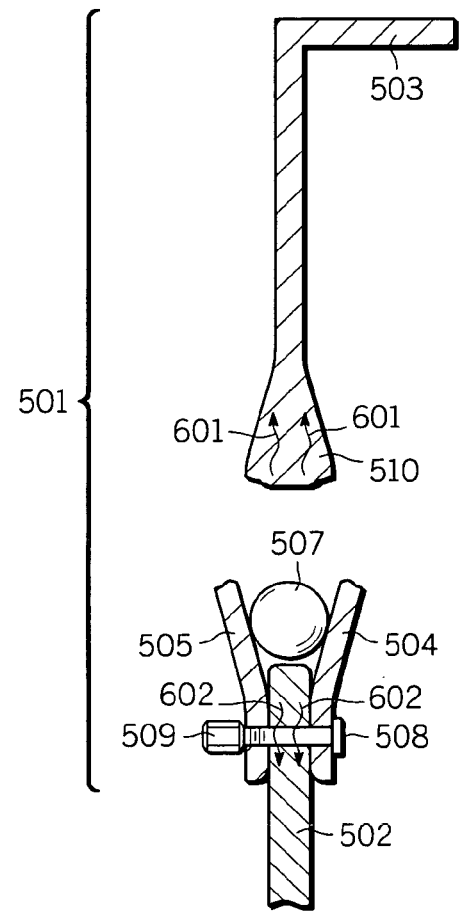

LOW SHOCK SEPARATION JOINT AND METHOD THEREFOR

TECHNICAL FIELD OF THE INVENTION

The present invention generally relates to separation joints, and more particularly relates to separation joints having an explosive ordnance.

BACKGROUND OF THE INVENTION

A launch vehicle such as a rocket requires a tremendous amount of energy to escape Earth's gravity. Thus, a primary goal in the design of a rocket is to maximize the payload that is carried while utilizing the minimum amount of fuel. An efficient methodology that has been widely used in the aerospace industry is a staged rocket. The premise behind a staged rocket is that unneeded mass is jettisoned as soon as possible thereby increasing the payload that can be sent. FIG. 1 is an illustration of a prior art two stage rocket 100. Rocket 100 comprises a first rocket stage 101, a second rocket stage 102, and a fairing 103. Initial acceleration of rocket 100 from standstill requires first rocket stage 101 to have high thrust engines and large propellant tanks to feed these engines. First rocket stage 101 provides thrust to accelerate the entire mass of rocket 100. First rocket stage 101 is separated from second rocket stage 102 and fairing 103 by a separation joint 104. Separation typically occurs at a high altitude where a large engine is no longer needed thereby greatly reducing the mass of rocket 100.

Second rocket stage 102 is enabled after separation from first rocket stage 101 to provide thrust to keep rocket 100 on its intended path. Similar to first rocket stage 101, second rocket stage 102 is no longer needed as it nears the intended destination. A separation joint 105 separates second rocket stage 102 from fairing 103. It also may be noted that in some circumstances, fairing 103 is separated from the rocket during first stage 101 burn in order to shed mass as soon as possible and maximize payload to orbit.

FIG. 2 is an illustration of prior art two stage rocket 100 of FIG. 1 showing first rocket stage 101, second rocket stage 102, and fairing 103 separated from one another. Separation of first rocket stage 101 from second rocket stage 102 exposes a rocket engine of rocket stage 102. Fairing 103 is separated exposing a payload 107 that was housed in fairing 103. Although rocket 100 is greatly simplified it illustrates the need for an extremely reliable separation system. A failure in any one of separation joints 104–106 of FIG. 1 would result in a complete failure of the mission at a cost of time, money, and perhaps human life.

Many different types of separation joints have been proven to be extremely reliable in applications similar to that described hereinabove. One type utilizes an explosive device to alter the separation joint from a fastened state to a decoupled state. In general, a separation joint comprises a first and second element. The first and second elements respectively couple to first and second structures that are to be separated under certain conditions. Typically, the first and second elements of the separation joint connect together in a manner where they do not separate under normal operating conditions. Separation of the joint is achieved when the explosive device is detonated. The most prevalent method of holding the separation joint together is to use bolts, rivets, or other mechanical fasteners.

FIG. 3 is a cross-sectional view of a prior art explosive device 300 used in a separation joint. Explosive device 300 comprises a tube 301 and an explosive material 302. In an embodiment of explosive device 300, explosive material 302 is a mild detonation cord. The mild detonation cord is often encased in a sheath that fits within the cavity of tube 301 such that the mild detonation cord is centrally located within tube 301. For example, the sheath may comprise silicone rubber or a shock absorbing/thermally insulating material. Contamination of the field around the separation joint is a critical issue. Tube 301 contains the debris generated from the explosion to prevent contamination of the area near the separation joint. Also, tube 301 is easily formed in a shape for a particular application. For example, a separation joint between two rocket stages is circular in shape, thus tube 301 is circumferentially placed in the joint separating the two rocket stages to provide simultaneously release when detonated.

FIG. 4 is a cross-sectional view of the prior art explosive device 300 of FIG. 4 after detonation. Detonation of explosive material 302 within tube 301 generates gases that radiate radially from the charge. Tube 301 expands under the pressure of the gases generated by the explosion but is designed not to rupture to prevent particle contamination. In an embodiment of explosive device 300, tube 301 is formed of thin walled stainless steel. The rapidly increasing pressure created by the detonation of explosive material 302 causes tube 301 to expand to a final state as shown in FIG. 4.

It is this change in volume of tube 301 from FIG. 3 to FIG. 4 after explosive material 302 is ignited that is used to produce a condition where a separation joint separates. As mentioned previously, separation joints are held together with rivets, bolts or other mechanical fasteners. The expansion of tube 301 generates an extremely high force. The force is applied in a manner to shear rivets or fracture elements of the separation joint thereby releasing the joint to separate.

A significant problem with this type of separation joint are the shockwaves that are generated. The shockwaves are coupled to the attached structures of the separation joint. The problem is greatly exacerbated by the release of constrained energy due to the shearing or fracturing of components in the separation process. Shockwaves of up to 5000 g can be coupled to the attached structure. For example, NASA estimates that 45% of all first day spacecraft failures are attributed to damage caused by high dynamic environments. This problem exists today with all new proposed spacecraft designs. Spacecraft are typically ground tested to detect failures using random vibration, acoustic, and shock testing to simulate a launch environment. Perhaps more sensitive to the shockwaves generated by the separation joint is the payload within the spacecraft. The payload is often extremely sensitive or fragile to shock. The cost increases greatly to design components (in the payload) to be more shock resistant. Much of the research is focused on ways to minimize damage to the payload using isolation and damping techniques on the platform on which the payload is mounted.

Accordingly, it is desirable to provide a separation joint that greatly reduces shockwaves transferred to an attached structure when separation occurs. In addition, it is desirable to provide reduce the cost of manufacture and increase the reliability of the separation system. Furthermore, other desirable features and characteristics of the present invention will become apparent from the subsequent detailed description and the appended claims, taken in conjunction with the accompanying drawings and the foregoing technical field and background.

BRIEF SUMMARY OF THE INVENTION

Methods and apparatus are provided for a low shock explosive separation joint. The separation joint comprises a male member, a female member, and an explosive device. The separation joint couples a first structure and a second structure. The male member has a first major surface and a second major surface. At least one projection is formed on the first and second major surface of the male member. A female member includes a first flange and a second flange. At least one projection is formed on the first and second flange of the female member. Surfaces of the at least one projection on the first and second flange are respectively mated to surfaces of the at least one projection on the first and second major surface of the male member. The explosive device is placed within a cavity of said female member. A method for reducing shock in a separation joint is provided. A male member is coupled to a female member such that surfaces on said male member are in intimate contact with corresponding surfaces on said female member. The surfaces in intimate contact on the male and female member prevent separation of the separation joint under tensile and compressive forces. An explosive device in the female member of the separation joint is detonated. A housing of the explosive device expands from a first volume to a second volume. The volume increase of the explosive device bends flanges of the female member away from one another. The surfaces in intimate contact with one another are moved out of contact with one another to decouple the male member from the female member.

BRIEF DESCRIPTION OF THE DRAWINGS

The present invention will hereinafter be described in conjunction with the following drawing figures, wherein like numerals denote like elements.

FIG. 3 is a cross-sectional view of a prior art explosive device used in a separation joint;

FIG. 4 is a cross-sectional view of the prior art explosive device of FIG. 4 after detonation;

FIG. 5 is a cross-sectional view of a prior art separation joint;

FIG. 6 is a cross-sectional view of prior art separation joint 501 of FIG. 5 after detonation of explosive device 507;

DETAILED DESCRIPTION OF THE INVENTION

Figure 1:
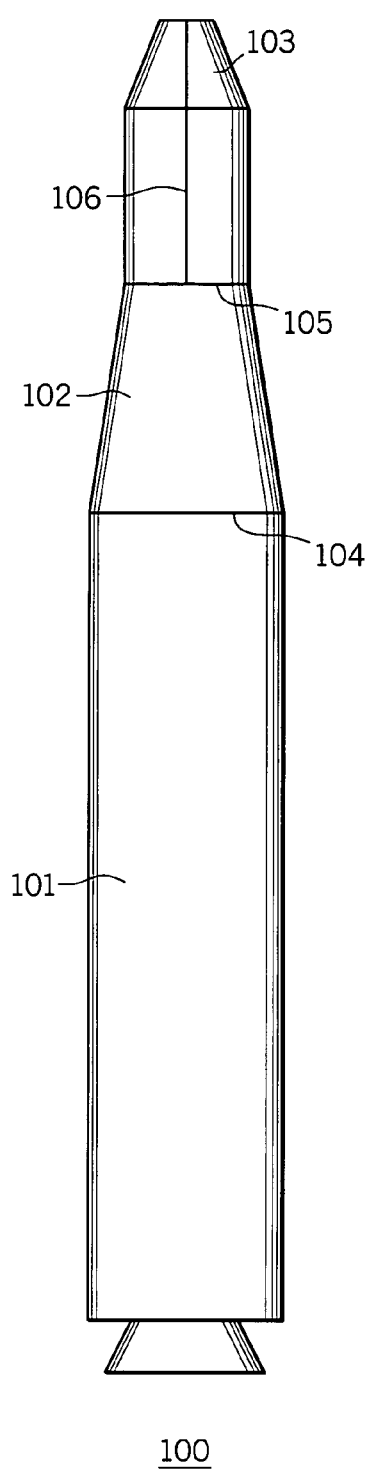
FIG. 1 is an illustration of a prior art two stage rocket.
Figure 2:
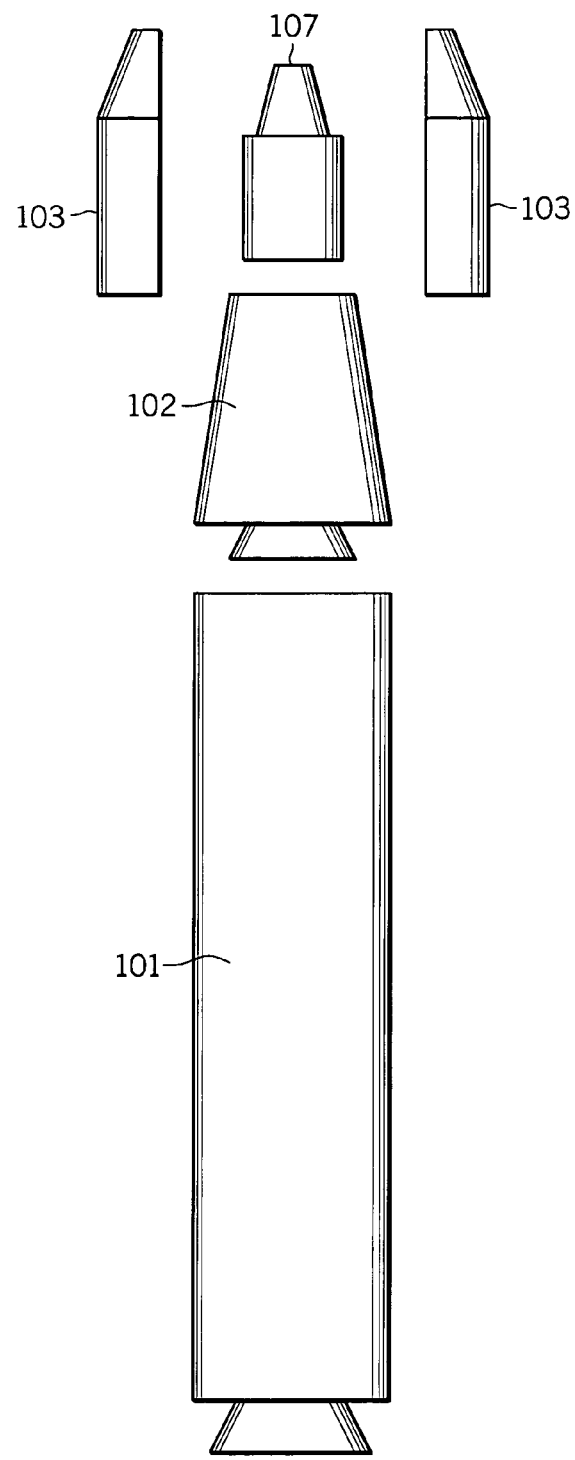
FIG. 2 is an illustration the prior art two stage rocket of FIG. 1 showing a first rocket stage, a second rocket stage, and a fairing separated from one another.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

FIG. 5 is a cross-sectional view of a prior art separation joint 501. In general, separation joint 501 comprises a single female joint structure. Separation joint 501 utilizes an explosive device 507 to impart a force that fractures separation joint 501 in a predetermined manner. Separation joint 501 comprises a main body 510, a mounting flange 503, explosive device 507, a flange 504, and a flange 505. Flanges 504 and 505 extend from main body 510 substantially parallel to one another forming a clevis. Explosive device 507 is fitted within the clevis. A structure 502 is also fitted within the clevis and is rigidly coupled to separation joint 501 by a bolt 508 and nut 509. Bolt 508 extends through flange 504, structure 502, and flange 505. Structure 502 is one of the components that are separated by separation joint 501 when explosive device 507 is detonated. The other structural component is not shown in FIG. 5 but attaches to flange 503 distal to main body 510.

In an embodiment of separation joint 501, one side of explosive device 507 abuts main body 510. An opposing side of explosive device 507 abuts structure 502 such that explosive device 507 does not move during normal operation of separation joint 501. Notches 506 are formed in flanges 504 and 505 to create a weak point in separation joint 501 that will readily fracture when explosive device 507 is detonated. Notches 506 are placed in a location where flanges 504 and 505 adjoin main body 510. Notches 506 are also placed near explosive device 507. It should be noted that separation joint 501 is made of a light weight but high strength material such as aluminum to rigidly couple a structure coupled to flange 503 to structure 502. Notches 506 do not compromise the requirement of separation joint 501 to withstand torsional, compressive, and tensile forces under normal operating conditions.

FIG. 6 is a cross-sectional view of prior art separation joint 501 of FIG. 5 after detonation of explosive device 507. Explosive device 507 is a tube type ordnance where the tube is an expandable housing. As shown in FIG. 5, explosive device 507 has a first volume prior to detonation that fits within the clevis of separation joint 501. The expandable tube of explosive device 507 is made of thinned wall metal that does not rupture upon detonation of the explosive material housed within. Preventing contamination of the area near separation joint 501 is highly desirable. Explosive device 507 is designed to expand to a second volume when detonated. The explosive material generates gas that radially expands explosive device 507 to a second volume. Explosive device 507 is constrained from expanding by flange 504, flange 505, main body 510, and structure 502. Notches 506 of FIG. 5 are the designed weak point of separation joint 501 that fractures or breaks when the force applied by explosive device 507 exceeds the material strength constraining explosive device 507 from expanding. An enormous amount of constrained energy is released upon the fracture of notches 506. The rapid volume increase of explosive device 507 bends flanges 504 and 505 outward as shown. Main body 510 is no longer coupled to flanges 504 and 505 when notches 506 of FIG. 5 fracture. Thus, main body 510 is free to separate.

Separation joint 501 has proven to be an extremely reliable separation component that has been widely used in the aerospace industry. One aspect of separation joint 501 is the generation of high magnitude shockwaves. Shockwaves are a concern because components coupled to separation joint 501 can be damaged by vibrations generated during separation. A significant amount of research and development has been dedicated to enhancing the structural integrity of components to withstand the shock as well as the creation of isolation/damping strategies to reduce vibration coupled to components. Typically, these modifications add weight, cost, and complexity to the design of the system. Moreover, these changes are directly related to the design of the separation joint and would not be needed if the shockwave could be reduced.

The shockwave is a high magnitude impulse because the release of constrained energy is instantaneous upon fracture of separation joint 501. For example, the upper limit for a separation joint used in a rocket assembly is a shockwave of approximately 5000 g. The shockwave travels in either direction through separation joint 501. A shockwave 601 is coupled through main body 510 to flange 503 where it is coupled to the attached structure. Similarly, a shockwave 602 is coupled through flanges 504 and 505 to structure 502. In general, separation methodologies that break an element holding the joint together create potentially damaging shockwaves when the constrained energy is released. Another example that is well known utilizes rivets to hold a separation joint together. An explosive device produces a force on the separation joint that shears the rivets holding the joint together which produces a similar high magnitude shockwave.

Figure 7:
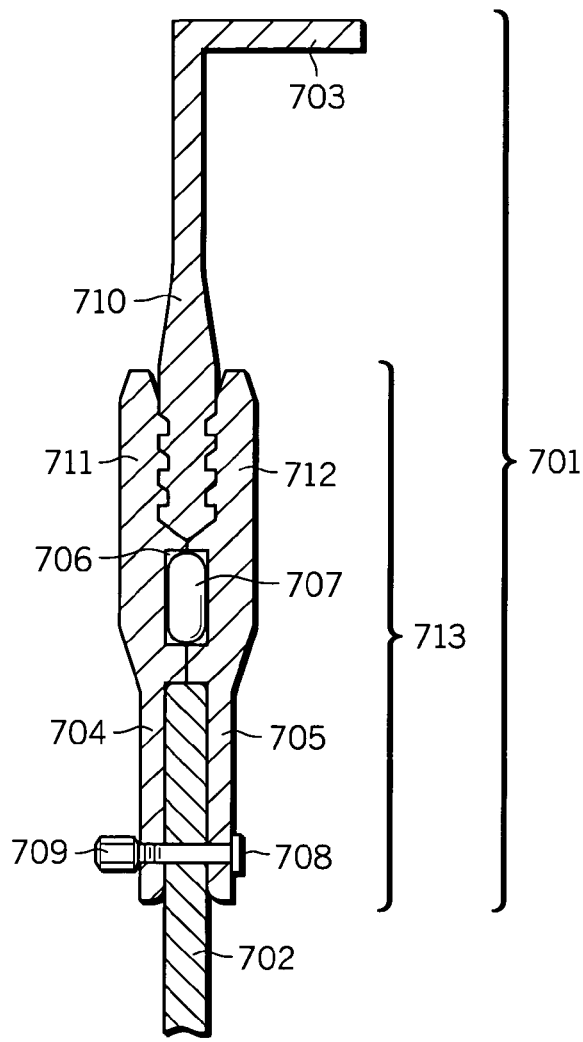
FIG. 7 is a cross-sectional view of a separation joint in accordance with the present invention.

FIG. 7 is a cross-sectional view of a separation joint 701 in accordance with the present invention. The approach used in separation joint 701 eliminates the release of constrained energy due to fracturing or breaking of components during separation since all components remain intact and unbroken. The shockwave produced by separation joint 701 is reduced by an order of magnitude or more when compared with fracturing type separation joints. Separation joint 701 comprises a male member 710 and a female member 713. Male member 710 includes surfaces for preventing separation of separation joint 701 under compressive and tensile forces. In an embodiment, of separation joint 701, male member 710 further includes a flange 703 for attachment to a structure (not shown). The particular shape of flange 703 is not critical to the design of male member 710 but can be modified or adapted for the attachment needs of the particular structure it is being coupled to.

Female member 713 comprises a flange 704, a flange 705, a flange 711, and a flange 712. Female member 713 also includes a cavity 706 for housing an explosive device 707. In an embodiment of separation joint 701, female member 713 is formed having two symmetrical halves. A first half of female member 713 includes flanges 704 and 711 on opposing ends. A second half of female member 713 includes flanges 705 and 712 on opposing ends. The halves of female member 713 align such that flanges 711 and 712 oppose one another and flanges 704 and 705 oppose one another. Flanges 711 and 712 include surfaces that correspond to the surfaces of male member 710 for preventing separation of separation joint 701 under compressive and tensile forces.

Separation joint 701 is assembled by placing the two halves of female member 713 on opposing sides of male member 710. Male member 710 is positioned and aligned such that surfaces for preventing separation of separation joint 701 under compressive and tensile forces on each half of female member 713 will mate with corresponding surfaces on male member 710. Explosive device 707 is aligned to female member 713 to fit in cavity 706 that is formed when the halves are placed together.

Placing the halves of female member 713 together retains male member 710 and explosive device 707. In an embodiment of separation joint 701, flanges 704 and 705 combine to form a clevis. A portion of structure 702 fits within the clevis. Structure 702 is fastened to flanges 704 and 705 by a fastening mechanism such as a bolt 708 and a nut 709. Tightening bolt 708 not only rigidly fastens structure 702 to female member 713 but holds separation joint 701 together for use under normal operating conditions. In general, normal operating conditions occur when separation joint 701 fastens structure 702 to another structure (not shown) that is coupled to flange 703. In other words, the normal condition occurs when separation join 701 is not separated and holds structures together. A separation event is not a normal operating condition. Tightening bolt 708 also forces male member 710 in contact with female member 713. In particular, the surfaces on male member 710 are placed in intimate contact with corresponding surfaces of flanges 711 and 712. Male member 710 is inhibited from moving within female member 713. Similarly, explosive device 707 is held under a slight clamping pressure applied by the walls of cavity 706.

Separation joint 701 is shown in cross-section allowing only a single fastening device to be illustrated. In reality, separation joint 701 may have a substantial length. For example, in a rocket assembly, separation joint 701 would be placed between two rocket stages around the entire circumference to couple the rocket stages together. Male member 710 would couple to one of the rocket stages and female member 713 to the other rocket stage. Fastening mechanisms such as bolts and nuts would be required periodically around the circumference to hold separation joint 701 together.

Note that the fastening mechanism holds the halves of female member 701 together on a side comprising flanges 704 and 705. There is no fastening mechanism holding flanges 711 and 712 to male member 710. Each half of female member 713 is made of sufficiently strong material to hold or retain male member 710 under torsional, compressive, and tensile forces imposed on separation joint 701 during normal operation. In general, female member 713 and male member 710 are made of metal. For example, separation joint 701 can be formed from 7075 or 6061 aluminum for an application in space flight where weight is critical. Magnesium is an example of another light weight metal that can be used. The compressive and tensile forces seen by separation joint 701 in a space flight is in the range of 900 to 5000 pounds per square inch. The thickness of flanges 704, 705, 711, 712, and male member 710 to meet these specifications is approximately 0.125 inches or greater.

Figure 8:
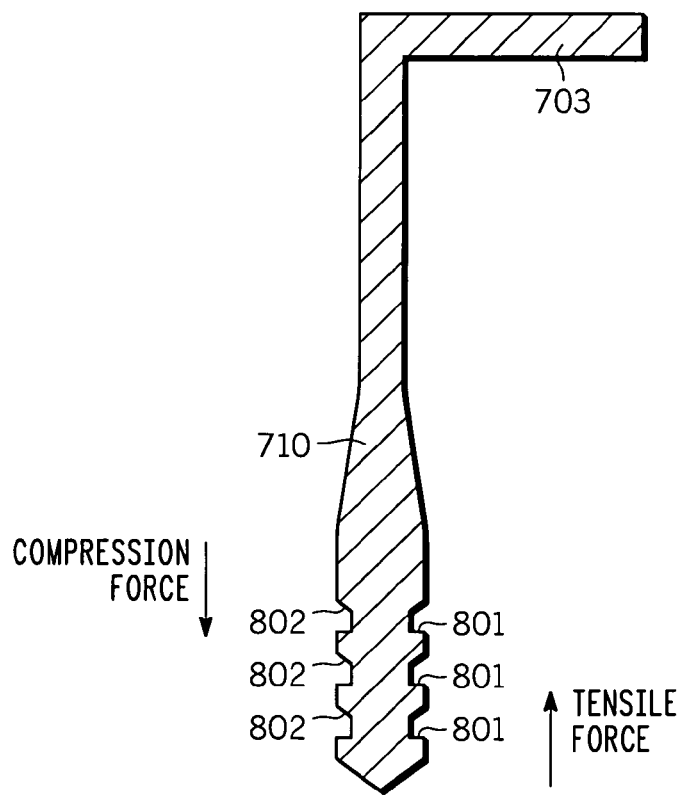
FIG. 8 is a cross-sectional view of male member 710 of FIG. 7 illustrating surfaces to prevent separation under compressive and tensile forces in accordance with the present invention.

FIG. 8 is a cross-sectional view of male member 710 of FIG. 7 illustrating surfaces 801 and 802 to prevent separation under compressive and tensile forces in accordance with the present invention. Male member 710 includes a flange 703 for attaching to a structure (not shown) and a plurality of flanges or projections that extend horizontally from a main body. The flanges are on opposing sides of male member 710 and correspond to flanges or projections on female member 713 of FIG. 7. Each projection on male member 710 has an upper surface 801 and a lower surface 802. Upper surfaces 801 prevent separation of male member 710 from female member 713 when tensile forces are applied to separation joint 701. Conversely, lower surfaces 802 prevent separation of male member 710 from female member 713 when compressive forces are applied to separation joint 701. In either case, upper surfaces 801 and lower surfaces 802 are in contact with corresponding surfaces of female member 713. The design of the projection and the amount of upper and lower surface area placed on each projection is a function of the loading placed on separation joint 701. A single projection on either side may be sufficient on the main body of male member 710 for light loads while multiple projections as shown in FIG. 8 are required for high load applications such as a separation joint between rocket stages. In an embodiment of separation joint 701, upper surfaces 801 and lower surfaces 802 are angled in a manner that prevents locking with the corresponding surfaces of female member 713. A separation event of separation joint 701 moves the surfaces of female member 713 out of contact with upper surfaces 801 and lower surfaces 802 thus separation is more repeatable and reliable if made non-locking.

Figure 9:
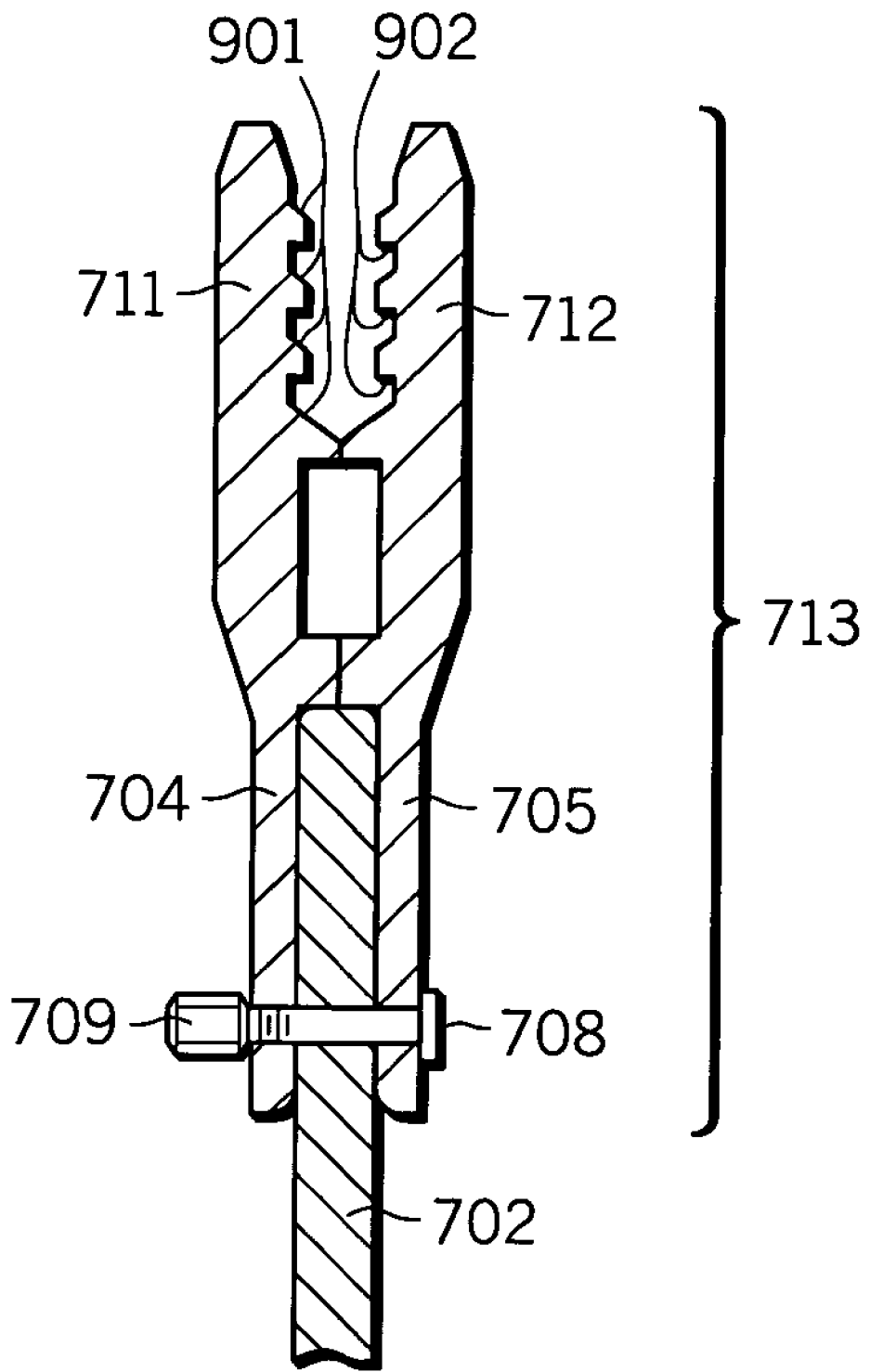
FIG. 9 is a cross-sectional view of female member 713 of FIG. 7 illustrating surfaces to prevent separation under compressive and tensile forces in accordance with the present invention.

FIG. 9 is a cross-sectional view of female member 713 of FIG. 7 illustrating surfaces 901 and 902 to prevent separation under compressive and tensile forces in accordance with the present invention. Female member 713 is shown in an assembled state fastened to structure 702 without male member 710 or explosive device 707 of FIG. 7. Flanges 704 and 705 are rigidly held to structure 702 by bolt 708 and nut 709. Flanges 711 and 712 each include a plurality of projections that extend horizontally from flanges 711 and 712 towards one another. Male member 710 as described in FIG. 8 has corresponding surfaces 801 and 802. Each projection on flanges 711 and 712 has an upper surface 901 and a lower surface 902. Upper surfaces 901 prevent separation of female member 713 from male member 710 under compressive forces. Conversely, lower surfaces 902 prevent separation of female member 713 from male member 710 under tensile forces. Flanges 711 and 712 aligns with male member 710 when fastened together such that upper surfaces 901 mate with surfaces 802 of male member 710. Similarly, lower surfaces 902 mate with surfaces 801 of male member 710.

Figure 10:
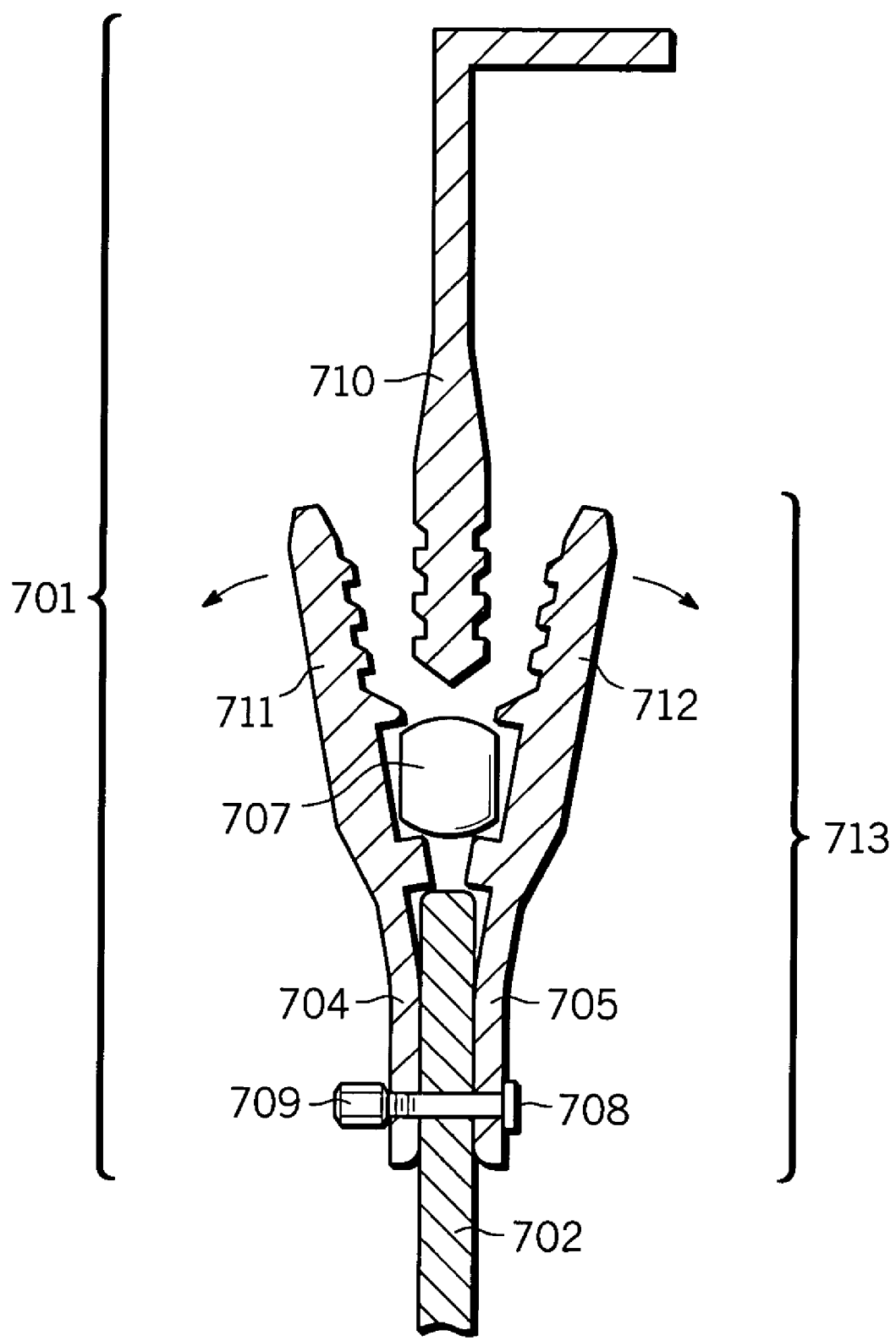
FIG. 10 is a cross-sectional view of the separation joint of FIG. 7 separating in accordance with the present invention.

FIG. 10 is a cross-sectional view of separation joint 701 of FIG. 7 separating in accordance with the present invention. Prior to detonation, explosive device 707 has a first volume. Explosive device 707 is placed within cavity 706 when female member 713 is assembled around male member 710. Normal operating conditions occur when separation joint 701 holds a structure attached to flange 703 to structure 702. Separation joint 701 is designed to withstand and not separate under compressive, tensile, and torsional forces that occur during the specific application. An example of a normal operating condition is in a rocket assembly where separation joint 701 holds a first rocket stage to a second rocket stage. In this example, female member 713 couples to the first rocket stage and male member 710 couples to the second rocket stage. The first rocket stage lifts the rocket assembly into the upper atmosphere. The first stage is jettisoned as the rocket assembly reaches an elevation that can be better serviced by the lighter and smaller second rocket stage. Losing the first stage greatly reduces the weight of the remaining rocket assembly and thus is much more efficient to propel the rocket further on its destination.

Explosive device 707 is detonated to separate male member 710 from female member 713, for example, separating the first rocket stage from the second rocket stage. A separation event is not a normal operating condition of separation joint 701 but a one time event that physically modifies female member 713 to ensure decoupling from male member 710. Explosive material within explosive device 707 is detonated which creates a high pressure gas that increases the volume of explosive device 707. In general, explosive device 707 is housed within a tube that expands but does not rupture upon detonation. It is highly desirable to prevent any particles generated from detonating explosive device 707 from contaminating an area near separation joint 701. The casing or tube of explosive device 707 retains all detonated explosive material.

Cavity 706 is located between flanges 711 and 712. When detonated, explosive device 707 starts to expand placing an extremely high force on flanges 711 and 712. The force bends flanges 711 and 712 away from one another. Flanges 711 and 712 move in an arc when forced apart by explosive device 707. All components of separation joint 701 are intact after detonation of explosive device 707, thus no shockwave is generated due to the release of constrained energy by fracturing. The movement of flanges 711 and 712 away from one another places surfaces of male member 710 and female member 713 out of contact with one another. In particular, surfaces 801 and 802 of male member 710 (FIG. 8) and surfaces 901 and 902 of female member 713 (FIG. 9) that prevent separation of separation joint 701 under compressive and tensile forces are no longer in contact with one another. As mentioned previously, surfaces 801 and 802 of male member 710 and surface 901 and 902 of female member 713 are mated but are not locking surfaces which aids in separation of separation joint 701. In the example using separation joint 701 in a rocket assembly, male member 710 is attached to the second stage of a rocket and continues on its intended flight path. Female member 713 is attached to the first rocket stage (structure 702) and either falls back to Earth where it can be retrieved or burns up in the atmosphere. A difference in the speeds of the male member 710 and female member 713 after detonation of explosive device 707 is enough to vertically move them the small distance required to move male member 710 from between flanges 711 and 712 thereby achieving separation. Alternately, a thrusting device could be added that provides a force that moves male member 710 and female member 713 away from one another. Separation joint 701 is low cost, simple to manufacture, easy to assemble, and reliable. Furthermore, the elimination of shockwaves due to the release of constrained energy will all allow more sensitive equipment to be part of a rocket payload and reduce the total mass of the rocket by not requiring components previously needed to damp the shockwave or isolate components from the shockwave.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A low shock separation joint for coupling a first structure to a second structure comprising:
   a male member having a first side, a second side opposite the first side, a plurality of first protrusions formed on and extending from the first side, and a plurality of second protrusions formed on and extending from the second side;
   a split female member having a first half structure and a second half structure, the first half structure having a first flange and a plurality of first flange protrusions formed on and extending from the first flange, the second half structure having a second flange and a plurality of second flange protrusions formed on and extending from the second flange, the first flange opposing the second flange, and the first flange protrusions and the second flange protrusions extending toward one another, wherein the plurality of first protrusions are configured to fit between and mate with the plurality of first flange protrusions, the plurality of second protrusions are configured to fit between and mate with the plurality of second flange protrusions, the plurality of first flange protrusions are configured to fit between and mate with the plurality of first protrusions, and the plurality of second flange protrusions are configured to fit between and mate with the plurality of second protrusions to prevent separation of the separation joint under tensile and compressive forces, and wherein the split female member is configured to clamp and hold the male member without any external fastening mechanism holding the first flange and the second flange to the male member;

the first half structure comprising a first cavity formed therein, and the second half structure comprising a second cavity formed therein, the first cavity and the second cavity forming a cavity for the female member when the first half structure and the second half structure are placed together;

the first and second flanges extending away from the cavity, and the female member separating the cavity from the male member, when the first half structure and the second half structure are placed together; and an explosive device placed within the cavity, the explosive device when detonated releases the male member from the female member, by bending and physically modifying the first flange away from the male member and by bending and physically modifying the second flange away from the male member, without causing breakage of any component of the separation joint.

2. The low shock separation joint as recited in claim 1 wherein said explosive device has a first volume within said cavity of said female member prior to detonation, wherein said explosive device has a second volume after detonation, and wherein said second volume is greater than said first volume.

3. The low shock separation joint as recited in claim 1 wherein said explosive device includes an expandable housing around an explosive material and wherein said expandable housing does not rupture when said explosive material is detonated.

4. The low shock separation joint as recited in claim 1 wherein said split female member comprises a deformable metal.

5. A low shock separation joint for coupling a first structure to a second structure comprising:

a male member having a first side, a second side opposite the first side, a plurality of first protrusions formed on and extending from the first side, and a plurality of second protrusions formed on and extending from the second side;

a split female member having a first half structure and a second half structure, the first half structure having a first flange and a plurality of first flange protrusions formed on and extending from the first flange, the second half structure having a second flange and a plurality of second flange protrusions formed on and extending from the second flange, the first flange opposing the second flange, and the first flange protrusions and the second flange protrusions extending toward one another, wherein each of the plurality of first protrusions and each of the plurality of second protrusions includes a flat upper surface and an angled lower surface opposite the flat upper surface, each of the plurality of first flange protrusions and each of the plurality of second flange protrusions includes an angled upper surface and a flat lower surface opposite the angled upper surface, the flat upper surfaces mate with the flat lower surfaces and the angled upper surfaces mate with the angled lower surfaces when the first half structure and the second half structure are placed together around the male member, and the split female member is configured to clamp and hold the male member without any external fastening mechanism holding the first flange and the second flange to the male member;

the first half structure comprising a first cavity formed therein, and the second half structure comprising a second cavity formed therein, the first cavity and the second cavity forming a cavity for the female member when the first half structure and the second half structure are placed together;

the first and second flanges extending away from the cavity, and the female member separating the cavity from the male member, when the first half structure and the second half structure are placed together; and an explosive device placed within the cavity, the explosive device when detonated releases the male member from the female member, by bending and physically modifying the first flange away from the male member and by bending and physically modifying the second flange away from the male member, without causing breakage of any component of the separation joint.

6. The low shock separation joint as recited in claim 2, wherein said explosive device has a first volume within said cavity of said female member prior to detonation, wherein said explosive device has a second volume after detonation, and wherein said second volume is greater than said first volume.

7. The low shock separation joint as recited in claim 2, wherein said explosive device includes an expandable housing around an explosive material and wherein said expandable housing does not rupture when said explosive material is detonated.

8. The low shock separation joint as recited in claim 5, wherein said split female member comprises a deformable metal.

* * * * *